(12) United States Patent
Lin

(10) Patent No.: US 10,122,193 B2
(45) Date of Patent: Nov. 6, 2018

(54) PORTABLE DEVICE AND METHOD FOR CONTROLLING CHARGING CURRENT THEREOF

(71) Applicant: HTC Corporation, Taoyuan, Taoyuan County (TW)

(72) Inventor: Shih-Ping Lin, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 178 days.

(21) Appl. No.: 14/286,500

(22) Filed: May 23, 2014

(65) Prior Publication Data

US 2015/0340893 A1    Nov. 26, 2015

(51) Int. Cl.
*H02J 7/00* (2006.01)
*H01M 10/44* (2006.01)
*H01M 10/48* (2006.01)

(52) U.S. Cl.
CPC .......... *H02J 7/0044* (2013.01); *H01M 10/44* (2013.01); *H01M 10/48* (2013.01); *H02J 7/007* (2013.01); *H02J 7/0077* (2013.01); *H02J 7/0091* (2013.01); *H01M 2220/30* (2013.01)

(58) Field of Classification Search
CPC .................................................. H02J 7/0044
See application file for complete search history.

(56) References Cited

U.S. PATENT DOCUMENTS

| | | | | |
|---|---|---|---|---|
| RE42,114 E | * | 2/2011 | Matsudai | H02J 9/061 320/128 |
| 2006/0082346 A1 | * | 4/2006 | Nagasawa | H02J 7/0029 320/150 |
| 2008/0024089 A1 | * | 1/2008 | Meng | H02J 7/0091 320/128 |
| 2008/0238357 A1 | | 10/2008 | Bourilkov et al. | |
| 2010/0308774 A1 | * | 12/2010 | Park | G06F 1/206 320/153 |
| 2012/0223672 A1 | * | 9/2012 | Liu | H01M 10/425 320/107 |
| 2013/0314054 A1 | * | 11/2013 | Bergqvist | H01M 10/44 320/162 |

(Continued)

FOREIGN PATENT DOCUMENTS

| | | |
|---|---|---|
| CN | 1764037 A | 4/2006 |
| CN | 101630762 B | 12/2011 |
| CN | 102456933 A | 5/2012 |

(Continued)

*Primary Examiner* — Robert Grant
*Assistant Examiner* — Tynese McDaniel
(74) *Attorney, Agent, or Firm* — Birch, Stewart, Kolasch & Birch, LLP

(57) ABSTRACT

A portable device is provided. The portable device includes a battery unit, a charger circuit, a detecting unit and a processing unit. The charger circuit provides a charging current to charge the battery unit according to an input power and adjusts the charging current to a charging value according to a first control signal. The detecting unit detects and obtains an instantaneous operating current, an instantaneous charging current and a system temperature in the portable device. The processing unit provides the first control signal according to the instantaneous operating current, the instantaneous charging current and the system temperature.

18 Claims, 4 Drawing Sheets

(56) References Cited

U.S. PATENT DOCUMENTS

2015/0155719 A1* 6/2015 Maleki .................. H02J 7/0091
　　　　　　　　　　　　　　　　　　　　　　320/151
2015/0372527 A1* 12/2015 Lim ..................... H02J 7/0091
　　　　　　　　　　　　　　　　　　　　　　320/150

FOREIGN PATENT DOCUMENTS

| CN | 103208659 A | 7/2013 |
| CN | 103219769 A | 7/2013 |
| TW | I396357 B1 | 5/2013 |
| TW | I436514 B | 5/2014 |

* cited by examiner

PORTABLE DEVICE AND METHOD FOR CONTROLLING CHARGING CURRENT THEREOF

BACKGROUND OF THE INVENTION

Field of the Invention

The invention relates to a portable device, and more particularly, to a method for controlling a charging current of a portable device.

Description of the Related Art

When a portable device (such as a personal digital assistant (PDA), a smart phone, a tablet PC and so on) performs high energy-consumption tasks like performing various wireless communications (e.g. telecommunication, Bluetooth, WiFi, etc.), playing videos or executing game programs, heat produced by chips for performing these tasks transfers to light-emitting elements, batteries or other electronic elements thereof via a printed circuit board, thus raising the temperature of the portable device, and thereby causing discomfort for a user. Furthermore, heat is also produced when the portable device is charged. Therefore, when a portable device is charged by an external power source and simultaneously performs high energy-consumption tasks, heat produced by chips therein is increased substantially.

Despite, heat dissipation is limited by the volume of a portable device. Therefore, it is desired to hinder the rising temperatures in portable devices without additional heat dissipating components.

BRIEF SUMMARY OF THE INVENTION

A portable device and method for controlling a charging current of the portable device are provided. An embodiment of a portable device is provided. The portable device includes a battery unit, a charger circuit, a detecting unit and a processing unit. The charger circuit is configured to provide a charging current to charge the battery unit according to an input power and to adjust the charging current to a charging value according to a first control signal. The detecting unit is configured to detect and obtain an instantaneous operating current, an instantaneous charging current and a system temperature in the portable device. The processing unit is configured to provide the first control signal according to the instantaneous operating current, the instantaneous charging current and the system temperature.

Furthermore, an embodiment of a method for controlling a charging current of a portable device, which has a battery unit, is provided. First, a charging current is provided to charge the battery unit according to an input power. Then, an instantaneous operating current, an instantaneous charging current and a system temperature in the portable device is detected and obtained. Next, a first control signal is provided according to the instantaneous operating current, the instantaneous charging current and the system temperature when the system temperature is between a first temperature value and a second temperature value higher than the first temperature value. Afterwards, the charging current is adjusted to a charging value according to the first control signal A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. It should be understood that many of the elements and signals described and illustrated throughout the specification are functional in nature and may be embodied in one or more physical entities or may take other forms beyond those described or depicted. In addition, the use of the terms "first," "second," and the like does not imply any particular order, but they are included to identify individual elements. Moreover, the use of the terms "first," "second," and the like does not denote any order or importance, but rather the terms "first," "second," and the like are used to distinguish one element from another.

Figure 1:
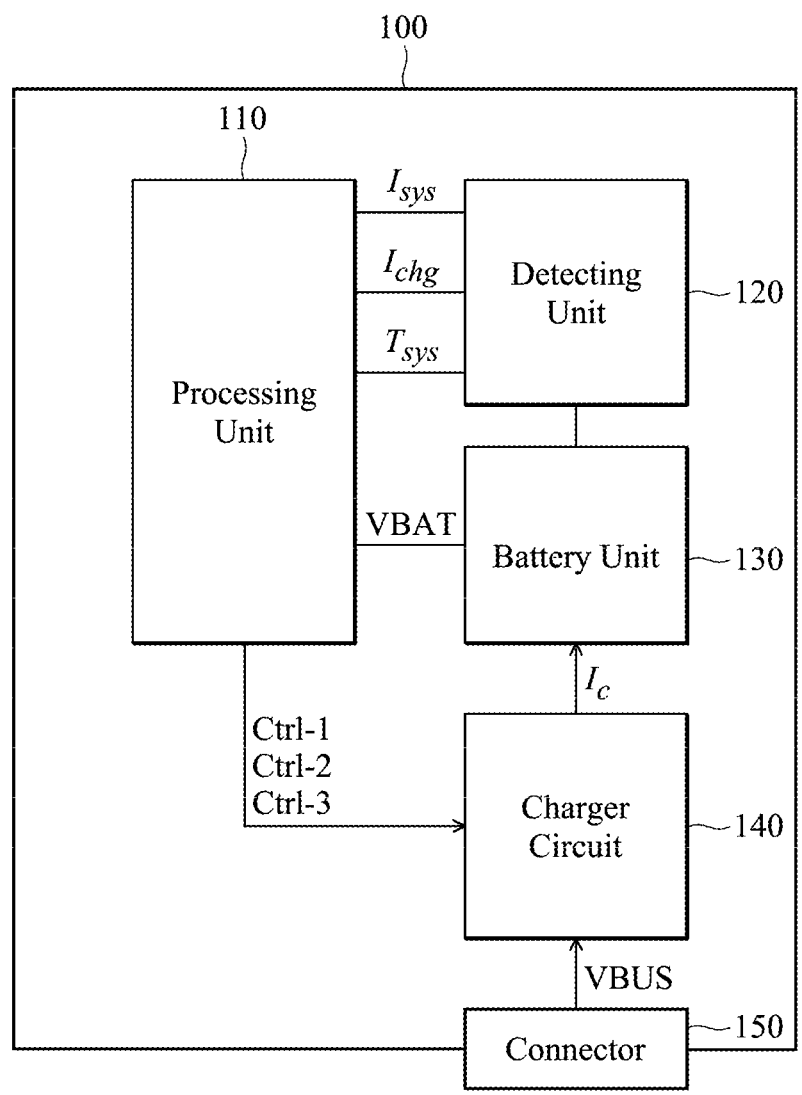
FIG. 1 shows a portable device according to an embodiment of the invention.

FIG. 1 shows a portable device 100 according to an embodiment of the invention. The portable device 100 comprises a processing unit 110, a detecting unit 120, a battery unit 130, a charger circuit 140 and a connector 150. In the embodiment, the portable device 100 may be a smart phone, PDA or tablet PC. The connector 150 may be a USB charging port for receiving an external power VBUS provided by a USB power adapter or a host device (e.g. a personal computer) via a USB cable. In general, a USB charging port supplies up to 500 mA at 5V. In other embodiments, the connector 150 may be a dedicated charge port, which may have a rated current of between 500 and 1500 mA. For all charging ports, there may be a maximum current of 5 A, as long as the connector can handle the current (e.g. the standard USB 2.0 A-connectors are rated at 1.5 A). Next, the charger circuit 140 receives the power VBUS from the connector 150 and a first control signal Ctrl-1, a second control signal Ctrl-2 or a third control signal Ctrl-3 from the processing unit 110 and then provides a charging current $I_c$ to charge the battery unit 130 according to the power VBUS and one of the first control signal Ctrl-1, the second control signal Ctrl-2 and the third control signal Ctrl-3. Thus, the battery unit 130 can provide a stable voltage VBAT to the processing unit 110 and other electronic components (not shown), like sensor chips, BT/WiFi chips, baseband chips, memory chips, display and so on, in the portable device 100. In the embodiment, the battery unit 130 may include a battery and a power management controller for providing the voltage VBAT according to power supplied by the battery. In the embodiment, the detecting unit 120 may include at least one current detector and at least one temperature detector. The current detector is configured to detect the charging current $I_c$ of the charger circuit 140 so as to obtain an instantaneous charging current $I_{chg}$ charged to the battery unit 130 and detect an operating current consumed by a system comprising the processing unit 110 and the other electronic components described above in the portable device 100 so as to obtain an instantaneous operating current $I_{sys}$. In other embodiment, the instantaneous charging current $I_{chg}$ may be obtained directly from the charger circuit 140. The temperature detector is configured to detect the temperature caused by the system of the portable device 100 so as to obtain a system temperature $T_{sys}$. In other embodiment, the detecting unit 120 may be a gas gauge integrated circuit (IC) configured to monitor the battery unit 130 and the charger circuit 140 so as to obtain information regarding the instantaneous charging current $I_{chg}$, the instantaneous operating current $I_{sys}$ and the system temperature $T_{sys}$ in the portable device 100. Next, the processing unit 110 provides the first control signal Ctrl-1, the second control signal Ctrl-2 or the third control signal Ctrl-3 to the charger circuit 140 according to at least one of the instantaneous operating current $I_{sys}$, the instantaneous charging current $I_{chg}$ and the system temperature $T_{sys}$, so that the charger circuit adjusts the charging current $I_c$ according to one of the first control signal Ctrl-1, the second control signal Ctrl-2 and the third control signal Ctrl-3 for temperature control.

In this embodiment, when the external power VBUS is input, the processing unit 110 will obtain the system temperature $T_{sys}$ from the detecting unit 120. Next, according to at least the system temperature $T_{sys}$, the processing unit 110 provides the first control signal Ctrl-1, the second control signal Ctrl-2 or the third control signal Ctrl-3 to the charger circuit 140, to control a current value of the charging current $I_c$. For example, if the system temperature $T_{sys}$ is lower than a threshold temperature $T_{adj}$ (i.e. $T_{sys} < T_{adj}$), the processing unit 110 provides the first control signal Ctrl-1 to the charger circuit 140, so that the charger circuit 140 adjusts the charging current $I_c$ to a maximum current value $I_{max}$ according to the first control signal Ctrl-1, wherein the threshold temperature $T_{adj}$ is a threshold value for the processing unit 110 to determine whether to adjust the charging current $I_c$ to the maximum current value $I_{max}$. If the system temperature $T_{sys}$ is higher than an allowable maximum temperature $T_{target}$ (i.e. $T_{sys} > T_{target}$), the processing unit 110 provides the second control signal Ctrl-2 to the charger circuit 140, so that the charger circuit 140 adjusts the charging current $I_c$ to a minimum current value $I_{min}$ according to the second control signal Ctrl-2, wherein the allowable maximum temperature $T_{target}$ is a target value for the processing unit 110 to determine whether to adjust the charging current $I_c$ to the minimum current value $I_{min}$ so that the temperature of the portable device 100 could be controlled to be lower than the allowable maximum temperature $T_{target}$. Furthermore, if the system temperature $T_{sys}$ is between the allowable maximum temperature $T_{target}$ and the threshold temperature $T_{adj}$ (i.e. $T_{adj} < T_{sys} < T_{target}$), the processing unit 110 provides the third control signal Ctrl-3 to the charger circuit 140 according to the instantaneous operating current $I_{sys}$, the instantaneous charging current $I_{chg}$ and the system temperature $T_{sys}$, so that according to the third control signal Ctrl-3, the charger circuit 140 adjusts the charging current $I_c$ to a charging value between the minimum current value $I_{min}$ and the maximum current value $I_{max}$. For example, when the instantaneous operating current $I_{sys}$ is increased, the processor 110 provides the third control signal Ctrl-3 to the charger circuit 140, so as to decrease the charging current $I_c$. On the contrary, when the instantaneous operating current $I_{sys}$ is decreased, the processor 110 provides the third control signal Ctrl-3 to the charger circuit 140, so as to increase the charging current $I_c$.

Figure 2:
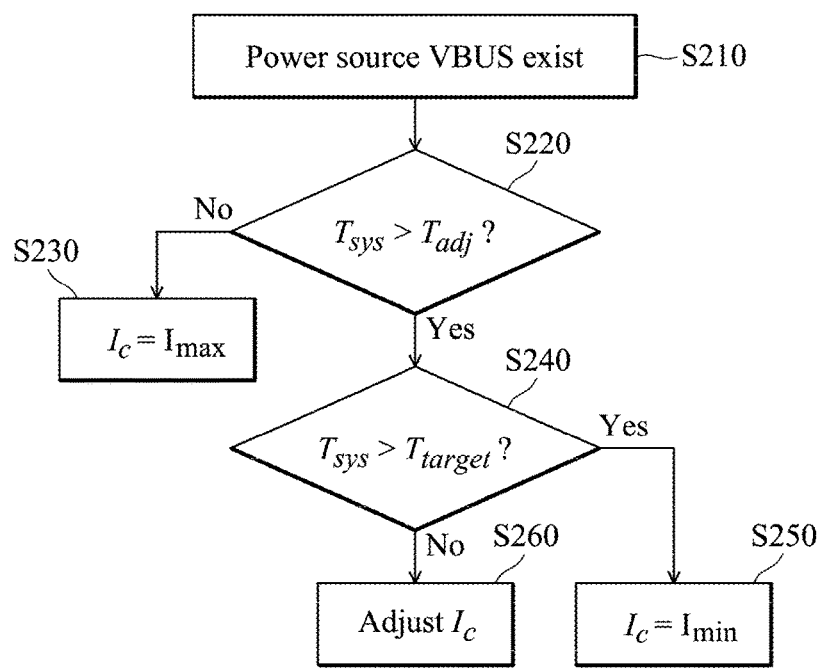
FIG. 2 shows a method for controlling a charging current of a portable device according to an embodiment of the invention.

FIG. 2 shows a method for controlling a charging current of a portable device according to an embodiment of the invention. Referring to FIG. 1 and FIG. 2 together, first, in step S210, it is determined that the external power VBUS is input. Next, in step S220, the processing unit 110 determines whether the system temperature $T_{sys}$ is higher than the threshold temperature $T_{adj}$. If the temperature $T_{sys}$ is not higher than or equal to the threshold temperature $T_{adj}$, the processing unit 110 provides the first control signal Ctrl-1 to the charger circuit 140, so as to adjust the charging current $I_c$ to the maximum current value $I_{max}$ (i.e. $I_c = I_{max}$) (step S230). On the contrary, if the system temperature $T_{sys}$ is higher than the threshold temperature $T_{adj}$, the processing unit 110 further determines whether the system temperature $T_{sys}$ is higher than the allowable maximum temperature $T_{target}$ (step S240). If the system temperature $T_{sys}$ is higher than the allowable maximum temperature $T_{target}$, the processing unit 110 provides the second control signal Ctrl-2 to the charger circuit 140, so as to adjust the charging current $I_c$ to the minimum current value $I_{min}$ (i.e. $I_c = I_{min}$) (step S250). Thus, the temperature of the portable device 100 is decreased. If the system temperature $T_{sys}$ is not higher than or equal to the allowable maximum temperature $T_{target}$, the processing unit 110 provides the third control signal Ctrl-3 according to the instantaneous operating current $I_{sys}$, the instantaneous charging current $I_{chg}$ and the system temperature $T_{sys}$, so as to dynamically adjust the charging current $I_c$ (step S260), wherein the charger circuit 140 provides the charging current $I_c$ according to a specific function of the maximum current value $I_{max}$ and according to the third control signal Ctrl-3. It should be noted that the sequences of step S220 and step S240 may be swapped.

Figure 3:
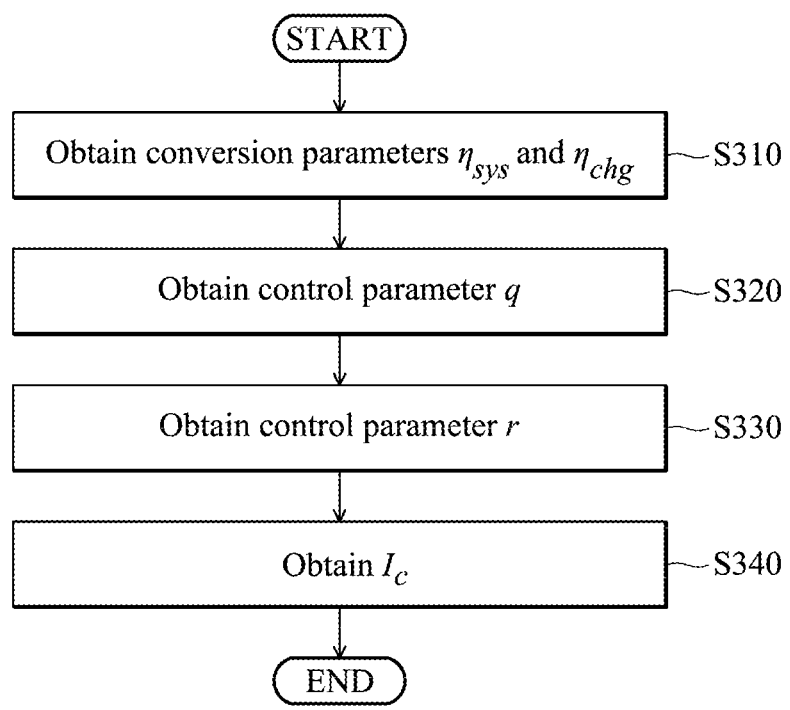
FIG. 3 shows an example illustrating a flowchart to obtain the charging current $I_c$ of FIG. 2 according to a specific function of maximum current value $I_{max}$.

FIG. 3 shows an example illustrating a flowchart to obtain the charging current $I_c$ of FIG. 2 according to the specific function of the maximum current value $I_{max}$. Referring to FIG. 1 and FIG. 3, first, in step S310, the conversion parameters $\eta_{sys}$ and $\eta_{chg}$ are obtained according to actual applications, wherein the conversion parameter $\eta_{sys}$ represents a relationship between a steady-state operating current $IS_{sys}$ and an equivalent steady-state raising temperature $TS_{sys}$ corresponding to the steady-state operating current $IS_{sys}$ in the portable device 100, as shown in the following equation (1):

$$\eta_{sys} \cong \frac{IS_{sys}}{TS_{sys}}, \tag{1}$$

where the steady-state operating current $IS_{sys}$ represents a steady value for the instantaneous operating current $I_{sys}$. For example, when the portable device 100 is used to play a multimedia file, the portable device 100 may consume an operating current of 800 mA and the temperature of the portable device 100 may rise from 25° C. and finally to 42° C. in a steady state. Hence, according to the equation (1), the conversion parameter $\eta_{sys}$ may be calculated by the following equation: $\eta_{sys} = 800$ mA÷(42−25)° C.=47 mA/° C. Moreover, the conversion parameter $\eta_{chg}$ represents a relationship between a steady-state charging current $IS_{chg}$ and an equivalent steady-state raising temperature $TS_{chg}$ corresponding to the steady-state charging current $IS_{chg}$ in the portable device 100, as shown in the following equation (2):

$$\eta_{chg} \cong \frac{IS_{chg}}{TS_{chg}}, \qquad (2)$$

where the steady-state charging current $IS_{chg}$ represents a steady value for the instantaneous charging current $I_{chg}$. For example, when a current of 1000 mA is used to charge the battery unit 130 of the portable device 100, the temperature of the portable device 100 may rise from 25° C. and finally to 30° C. in a steady state. Hence, according to the equation (2), the conversion parameter $\eta_{chg}$ may be calculated by the following equation: $\eta_{chg}$=1000 mA÷(30−25)° C.=200 mA/° C. Next, in step S320, a control parameter q is obtained, which is used to represent a ratio of a difference between the allowable maximum temperature $T_{target}$ and the system temperature $T_{sys}$ to a difference between the allowable maximum temperature $T_{target}$ and the threshold temperature $T_{adj}$, as shown in the following equation (3):

$$q \cong \frac{T_{target} - T_{sys}}{T_{target} - T_{adj}}. \qquad (3)$$

For example, assuming that the allowable maximum temperature $T_{target}$ is 40° C. and the threshold temperature $T_{adj}$ is 35° C., if the system temperature $T_{sys}$ is 30° C., the control parameter q is equal to 2 (e.g. (40−30)/(40−35)), that is, the control parameter q is larger than 1 (i.e. q>1). If the system temperature $T_{sys}$ is 37° C. the control parameter q is equal to 0.6 (e.g. (40−37)/(40−35)), that is, the control parameter q is smaller than 1 and larger than 0 (i.e. 0<q≤1). If the system temperature $T_{sys}$ is 42° C., the control parameter q is equal to −0.4 (e.g. (40−42)/(40−35)), that is, the control parameter q is smaller than 0 (i.e. q≤0). Therefore, if the control parameter q is increased (that is, the difference between the allowable maximum temperature $T_{target}$ and the system temperature $T_{sys}$ increases), the processing unit 110 provides the third control signal Ctrl-3 to the charger circuit 140, so as to increase the charging current $I_c$. Thus, the charging time is shortened for the battery unit 130. Contrarily, if the control parameter q is decreased (that is, the difference between the allowable maximum temperature $T_{target}$ and the system temperature $T_{sys}$ decreases), the processing unit 110 provides the third control signal Ctrl-3 to the charger 140 circuit, so as to decrease the charging current $I_c$. Thus, the rise in temperature caused by the charging current $I_c$ to the battery unit 130 is decreased.

Figure 4:
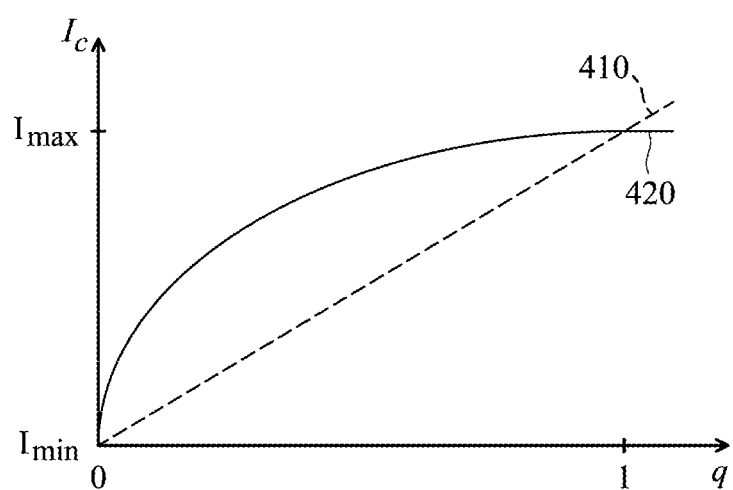
FIG. 4 shows a diagram illustrating the relationships between the charging current $I_c$ and the control parameters q and r.

Next, in step S330, a control parameter r is obtained, which is used to represent a difference between one and a ratio of a sum of the equivalent steady-state raising temperature $TS_{sys}$ and the equivalent steady-state raising temperature $TS_{chg}$ to a maximum equivalent temperature that a maximum steady-state operating current and a maximum steady-state charging current may cause, as shown in the following equation (4):

$$r \cong 1 - \frac{TS_{sys} + TS_{chg}}{TS_{sys\_max} + TS_{chg\_max}}, \qquad (4)$$

where $TS_{sys\_max}$ represents an equivalent steady-state raising temperature corresponding to the maximum steady-state operating current, and $TS_{chg\_max}$ represents an equivalent steady-state raising temperature corresponding to the maximum steady-state charging current. Therefore, when the sum of the equivalent steady-state raising temperature $TS_{sys}$ corresponding to the steady-state operating current $IS_{sys}$ and the equivalent steady-state raising temperature $TS_{chg}$ corresponding to the steady-state charging current $IS_{chg}$ is decreased, the control parameter r is increased, which means that the steady-state charging current $IS_{chg}$ and the steady-state operating current $IS_{sys}$ have a smaller influence on thermal effect for the portable device 100, thus the charging current $I_c$ is increased. On the contrary, when the sum of the equivalent steady-state raising temperature $TS_{sys}$ and the equivalent steady-state raising temperature $TS_{chg}$ is increased, the control parameter r is decreased, which means that the steady-state charging current $IS_{chg}$ and the steady-state operating current $IS_{sys}$ have greater influence on thermal effect for the portable device 100, thus the charging current $I_c$ is decreased. Next, in step S340, according to the control parameters q and r of the specific function, the charging current $I_c$ is obtained via the following equation (5), wherein the specific function is determined according various system characteristics. For example, the control parameter q may be a first-order linear function, and the specific function of the charging current $I_c$ can be as shown in the following equation (5):

$$\begin{aligned} I_c &\cong q \times r \times I_{max} \\ &\cong \frac{T_{target} - T_{sys}}{T_{target} - T_{adj}} \times \left(1 - \frac{TS_{sys} + TS_{chg}}{TS_{sys\_max} + TS_{chg\_max}}\right) \times \\ &\quad I_{max}, \text{ if } 0 < q \le 1, \end{aligned} \qquad (5)$$

wherein a characteristic curve 410 of FIG. 4 shows a relationship between the charging current $I_c$ and the control parameter q according to the equation (5). Furthermore, the control parameter q may be an exponential function, and the specific function of the charging current $I_c$ can be as shown in the following equation (6):

$$\begin{aligned} I_c &\cong p \times r \times I_{max} \\ &\cong [1 - \exp(-q \times \tau)] \times r \times I_{max} \\ &\cong \left[1 - \exp\left(-\frac{T_{target} - T_{sys}}{T_{target} - T_{adj}} \times \tau\right)\right] \times \\ &\quad \left(1 - \frac{TS_{sys} + TS_{chg}}{TS_{sys\_max} + TS_{chg\_max}}\right) \times I_{max}, \text{ if } 0 < q \le 1, \end{aligned} \qquad (6)$$

where τ is a constant value, wherein a characteristic curve 420 of FIG. 4 shows a relationship between the charging current $I_c$ and the control parameter q according to the equation (6). Furthermore, as described above, if the control parameter q is smaller than 0, the charging current $I_c$ can be adjusted to a minimum current value $I_{min}$; or if the control parameter q is larger than 1, the charging current $I_c$ can be adjusted to a maximum current value $I_{max}$, as shown in the following equations:

$$I_c \cong I_{min}, \text{ if } q \le 0$$

$$I_c \cong I_{max}, \text{ if } q > 1.$$

According to the embodiments, an operating current and a charging current that cause temperature to rise on a portable device can be converted to equivalent steady-state raising temperatures. Therefore, in response to a difference between an allowable maximum temperature and a system temperature of the portable device, the charging current can be adjusted, thus the temperature of the portable device can be decreased.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable device, comprising:
    a battery unit;
    a charger circuit configured to provide a charging current to charge the battery unit according to an input power and to adjust the charging current to a charging value according to a first control signal;
    a detecting unit configured to detect and obtain an operating current consumed by the portable device, the charging current provided to the battery unit, and a system temperature in the portable device; and
    a processing unit configured to provide the first control signal according to the operating current, the charging current and the system temperature when the system temperature is between a first temperature value and a second temperature value higher than the first temperature value, so as to adjust the charging current to the charging value in exponential proportion with a first control parameter,
    wherein the first control parameter is obtained by dividing a first temperature difference by a second temperature difference, and the first temperature difference represents a difference between the second temperature value and the system temperature, and the second temperature difference represents a difference between the second temperature value and the first temperature value, and
    wherein the first temperature value is a threshold temperature for the processor to determine whether to adjust the charging current to a maximum charging current value, and the second temperature value is an allowable maximum temperature for the processor to determine whether to adjust the charging current to a minimum charging current value.

2. The portable device as claimed in claim 1, wherein the charging value is between a maximum current value and a minimum current value.

3. The portable device as claimed in claim 2, wherein when the system temperature is lower than the first temperature value, the processing unit is further configured to provide a second control signal, and wherein the charger circuit is further configured to adjust the charging current to the maximum current value according to the second control signal.

4. The portable device as claimed in claim 2, wherein when the system temperature is higher than the second temperature value, the processing unit is further configured to provide a second control signal, and wherein the charger circuit is further configured to adjust the charging current to the minimum current value according to the second control signal.

5. The portable device as claimed in claim 2, wherein the charger circuit provides the charging current according to a specific function of the maximum current value and according to the first control signal, wherein the specific function comprises the first control parameter, and the first control parameter is equal to $$\frac{T_{target} - T_{sys}}{T_{target} - T_{adj}},$$

where Tadj represents the first temperature value, Ttarget represents the second temperature value, and Tsys represents the system temperature.

6. The portable device as claimed in claim 5, wherein the charging current has the maximum current value when the system temperature is lower than the first temperature value, and the charging current has the minimum current value when the system temperature is higher than the second temperature value.

7. The portable device as claimed in claim 2, wherein when the operating current is increased and the system temperature is between the first temperature value and the second temperature value, the processing unit provides the first control signal to the charger circuit, so as to decrease the charging current.

8. The portable device as claimed in claim 7, wherein when the operating current is decreased and the system temperature is between the first temperature value and the second temperature value, the processing unit provides the first control signal to the charger circuit, so as to increase the charging current.

9. The portable device as claimed in claim 8, wherein when the system temperature is lower than the first temperature value, the processing unit is further configured to provide a second control signal to the charger circuit, so as to increase the charging current to the maximum current value, and when the system temperature is higher than the second temperature value, the processing unit is further configured to provide a third control signal to the charger circuit, so as to decrease the charging current to the minimum current value.

10. A method for controlling a charging current of a portable device having a battery unit, comprising:
    providing a charging current according to an input power to charge the battery unit;
    detecting and obtaining an operating current consumed by the portable device, the charging current provided to the battery unit, and a system temperature in the portable device;
    providing a first control signal according to the operating current, the charging current and the system temperature when the system temperature is between a first temperature value and a second temperature value higher than the first temperature value; and
    adjusting the charging current according to the first control signal and a first control parameter, wherein the charging current is adjusted to a charging value in exponential proportion with the first control parameter, wherein the first control parameter is obtained by dividing a first temperature difference by a second temperature difference, and the first temperature difference represents a difference between the second temperature value and the system temperature, and the second temperature difference represents a difference between the second temperature value and the first temperature value, and wherein the first temperature value is a threshold temperature for the processor to determine whether to adjust the charging current to a maximum charging current value, and the second temperature value is an allowable maximum temperature for the processor to determine whether to adjust the charging current to a minimum charging current value.

11. The method as claimed in claim 10, wherein the charging value is between a maximum current value and a minimum current value.

12. The method as claimed in claim 11, further comprising:
providing a second control signal when the system temperature is lower than the first temperature value; and
adjusting the charging current to the maximum current value according to the second control signal.

13. The method as claimed in claim 11, further comprising:
providing a second control signal when the system temperature is higher than the second temperature value; and
adjusting the charging current to the minimum current value according to the second control signal.

14. The method as claimed in claim 11, wherein the step of providing the charging current further comprises:
providing the charging current according to a specific function of the maximum current value and according to the first control signal,
wherein the specific function comprises the first control parameter, and the first control parameter is equal to $$\frac{T_{target} - T_{sys}}{T_{target} - T_{adj}},$$

where Tadj represents the first temperature value, Ttarget represents the second temperature value, and Tsys represents the system temperature.

15. The method as claimed in claim 14, wherein the charging current has the maximum current value when the system temperature is lower than the first temperature value, and the charging current has the minimum current value when the system temperature is higher than the second temperature value.

16. The method as claimed in claim 11, wherein the step of providing the first control signal further comprises:
providing the first control signal when the operating current is increased and the system temperature is between the first temperature value and the second temperature value.

17. The method as claimed in claim 16, wherein the step of providing the first control signal further comprises:
providing the first control signal when the charging current is decreased and the system temperature is between the first temperature value and the second temperature value.

18. The method as claimed in claim 17, further comprising:
providing a second control signal when the system temperature is lower than the first temperature value;
increasing the charging current to the maximum current value according to the second control signal;
providing a third control signal when the system temperature is lower than the second temperature value; and
decreasing the charging current to the minimum current value according to the third control signal.

* * * * *